US011645692B2

(12) United States Patent
Xia et al.

(10) Patent No.: US 11,645,692 B2
(45) Date of Patent: May 9, 2023

(54) GENERATING TRAINING DATA FOR A COMPUTER-IMPLEMENTED RANKER

(71) Applicant: Microsoft Technology Licensing, LLC, Redmond, WA (US)

(72) Inventors: Xiaozhen Xia, Bellevue, WA (US); Jun Pan, Bellevue, WA (US); Yumao Lu, Bellevue, WA (US); Bhimani Kalpesh Sureshchandra, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 450 days.

(21) Appl. No.: 16/690,072

(22) Filed: Nov. 20, 2019

(65) Prior Publication Data

US 2021/0150606 A1 May 20, 2021

(51) Int. Cl.
*G06Q 30/00* (2012.01)
*G06Q 30/0601* (2023.01)
*G06F 16/9532* (2019.01)
*G06F 16/9538* (2019.01)

(52) U.S. Cl.
CPC ..... *G06Q 30/0629* (2013.01); *G06F 16/9532* (2019.01); *G06F 16/9538* (2019.01)

(58) Field of Classification Search
CPC ............ G06Q 30/0629; G06F 16/9532; G06F 16/9538
See application file for complete search history.

(56) References Cited

U.S. PATENT DOCUMENTS

| 2010/0274821 | A1 | 10/2010 | Bernstein et al. |
| 2011/0040769 | A1 | 2/2011 | Tseng et al. |
| 2012/0317088 | A1 | 12/2012 | Pantel et al. |
| 2014/0344102 | A1* | 11/2014 | Cooper .............. G06Q 30/0631 705/26.7 |
| 2020/0265095 | A1* | 8/2020 | Bhimani ............. G06F 16/9535 |
| 2021/0248446 | A1* | 8/2021 | Hughes ............. G06Q 30/0601 |

OTHER PUBLICATIONS

Karmaker Santu, Shubhra Kanti, Parikshit Sondhi, and ChengXiang Zhai. "On application of learning to rank for e-commerce search." Proceedings of the 40th international ACM SIGIR conference on research and development in information retrieval. 2017.*
"International Search Report and Written Opinion Issued in PCT Application No. PCT/US20/057440", dated Jan. 28, 2021, 10 Pages.

* cited by examiner

*Primary Examiner* — Kathleen Palavecino
(74) *Attorney, Agent, or Firm* — Calfee, Halter & Griswold LLP

(57) ABSTRACT

Technologies relating to generation of training data for use in training a computer-implemented ranker are described. A product name extracted from a URL in a log entry of a search log of a search engine is mapped to a catalog product name from a catalog of a website, wherein the catalog product name identifies a product that is available for acquisition by way of a webpage of a website. A query assigned to the URL in the log entry is assigned to the catalog product name due to the product name being mapped to the catalog product name. The computer-implemented ranker is trained based upon the query being assigned to the catalog product name.

20 Claims, 12 Drawing Sheets

GENERATING TRAINING DATA FOR A COMPUTER-IMPLEMENTED RANKER

BACKGROUND

Several websites exist that are configured to offer products and/or services for acquisition by way of webpages of the website. These websites have conventionally been designed to support searching and ranking of products that are offered for acquisition by way of the webpages of the website. For example, a website may be configured to offer thousands of products for acquisition by way of such website. Hence, when a query pertaining to a product is received (from a client computing device) at a computing system that hosts the website, the computing system is configured to search through a catalog of products that are available for acquisition, identify products that are germane to the query, rank the identified products, and return a ranked list of products to the client computing device. For instance, a website may be configured to offer electronic goods for acquisition to users of the website; a client computing device can submit the query "big screen television" to the website, and the website can return (ranked) products that are germane to such query to the client computing device (in hopes that the user who issued the query will select a product in the from amongst the returned products and subsequently purchase such product by way of the website).

Conventionally, searching and ranking technologies employed by websites lack robustness, as owners/operators of the websites are not experts in searching and ranking technologies. To address this difficulty, the owners/operators of websites have turned to companies that are experts in searching and ranking technologies to handle searching and ranking of products based upon queries received from client computing devices. More specifically, a query that is received by a website is transmitted to a search computing system that is operated by a third party, wherein the search computing system generates a ranked list of products that are offered for acquisition by way of the website based upon the received query. For instance, the search computing system can be provided with a catalog of products that are offered for acquisition by way of the website, and the search computing system can construct a searchable index for products included in the catalog. When a computing system that hosts the website receives a query from a client computing device, the computing system is configured to direct the query to the search computing system, which searches over the searchable index and ranks products based upon the query and further based upon features of such products. The search computing system then returns a ranked list of products to the computing system that hosts the website, which in turn can transmit the ranked list of products to the client computing device from which the query was received. This arrangement is beneficial to all parties involved, as the user who issued the query receives search results that are relevant to the query, the owner/operator of the website benefits due to an increase in sales, and the organization that provides the searching and ranking technologies to the website benefits by generating revenue based upon the searching and ranking services provided to the website.

To generate a robust computer-implemented ranker, training data is conventionally used to train the computer-implemented ranker. When, however, an owner/operator of a website initially offloads searching and ranking of products to the search computing system, there is a lack of training data that can be used to train a computer-implemented ranker that is customized for the catalog of the website.

Conventionally, the search computing system employs a general-purpose ranker to rank products that are offered for acquisition by the website; however, such general-purpose ranker is not customized for the products being offered for acquisition by the website. Over time, training data is collected as end users interact with search results returned to the website by the search system. Prior to a sufficient amount of training data being collected to train a customized computer-implemented ranker, however, sub-optimal search results may be returned to users who submit queries to the website (which may result in user angst and loss of revenue).

SUMMARY

The following is a brief summary of subject matter that is described in greater detail herein. This summary is not intended to be limiting as to the scope of the claims.

Described herein are various technologies pertaining to generating training data that is to be used to train a computer-implemented ranker for a website that offers products for acquisition by way of webpages of the website. In an example, conventionally, a computer-implemented ranker is trained based upon product name/query pairs, where each product name/query pair includes a query submitted by a user to the website (where products are available for acquisition) and a name of a product that was selected by the user from amongst search results returned by the website. Once a sufficient number of product name/query pairs are acquired, a computer-implemented ranker is trained based upon such product name/query pairs, such that the computer-implemented ranker ranks product names based upon queries in accordance with observed user interactions with product names upon issuing queries.

As indicated previously, owners/operators of websites are offloading searching and ranking of product names to organizations that have expertise in searching and ranking technologies, wherein such organizations dedicate a significant amount of resources in searching and ranking technologies. An owner/operator of a website who desires to offload searching and ranking of product names, however, may not have sufficient training data to allow for the organization to train a computer-implemented ranker that is customized for the catalog of the website, as the website may have a relatively small number of users (e.g., the website may be a relatively new website), the website may not have retained user interaction information, etc. The technologies described herein are related to generating product name/query pairs that include products names in a catalog of the website, wherein a computer-implemented ranker is trained based upon the product name/query pairs (thereby generating a computer-implemented ranker that is customized for the catalog of the website).

Numerous steps can be undertaken when generating training data that is to be used to train the computer-implemented ranker for the website, wherein products from amongst a catalog of products are offered for acquisition by way of webpages of the website. For example, a search log of a general-purpose search engine is searched to identify webpages selected by users, wherein products are available for acquisition by way of the webpages. Hence, the search log can be searched for webpages having Uniform Resource Locators (URLs) that include domain names from a predefined set of domain names, wherein such domain names correspond to websites that offer products for acquisition by way of webpages of such website. For instance, a log entry in the search log of the general-purpose search engine can include a webpage that has a URL that comprises a domain name from amongst the predefined set of domain names, wherein a website corresponding to the domain name is known to offer products for acquisition. The log entry also includes a query that was set forth by a user who selected the webpage from amongst search results returned by the general-purpose search engine when the user submitted the query.

A product name can then be extracted from the URL in the log entry. For instance, URLs that include a certain domain name may have a known structure, wherein product names appear in consistent locations in the URLs. For example, URLs that include the domain name "domain1" may have the following structure: www.domain1.com/p/productname, wherein a product name appears after the sequence "/p/". In another example, URLs that include the domain name "domain2" may have the following structure: www.domain2.com/productname, wherein a product name appears after ".com/". By extracting the product name from the URL, a product name/query pair is generated. This process can be repeated such that several product name/query pairs can be generated from the search log of the general-purpose search engine.

A word encoder that performs word embedding can be provided with the product names from the product name/query pairs referenced above. For each unique product name, the word encoder outputs a vector of predefined length, wherein two similar vectors represent two product names that are semantically and syntactically similar. The word encoder can be trained based upon numerous product names, such that semantically similar product names are mapped to similar vectors of the predefined length (e.g., the product names "clothes washer" and "washing machine" can be transformed into similar vectors by the word encoder).

As indicated previously, the website for which the computer-implemented ranker is to be trained can be configured to offer a set of products in a catalog of the website for acquisition to end users. Product names that represent such products are provided to the word encoder that, as described above, generates a respective vector of fixed length for each product name provided to the word encoder. Hence, the word encoder outputs a set of encoded catalog product names from the catalog of products that are to be offered for acquisition by way of the website.

A distance can be computed between each encoded catalog product name and each encoded product name that is based upon a respective product name from a product name/query pair. When the distance between an encoded catalog product name and an encoded product name is less than a predefined threshold, the query from the product name/query pair that corresponds to the encoded product name is assigned to the product name from the catalog of the website. Hence, a product name/query pair is generated for the product name from the catalog of the website even though such product name/query pair may not have been reported by the website itself. It can therefore be ascertained that numerous product name/query pairs can be generated for products in the catalog of products being offered for acquisition by way of the website. A computer-implemented ranker can be trained based upon such product name/query pairs. Once trained, the computer-implemented ranker is deployed and ranks webpages that correspond to products based upon queries set forth by users of the website who are searching for products to purchase.

In addition, a computer-implemented index for the website can be enriched using the technologies described herein. For example, when it is ascertained that the distance between the encoded catalog product name and the product name extracted from a log entry in the search engine log is beneath the threshold, metadata from the webpage represented in the log entry can be assigned to the catalog product name. For example, the webpage represented in the log entry can include information about a particular model number of a product. The model number can be extracted from the webpage as metadata and the model number can be mapped to the catalog product name in the above-referenced index. Therefore, if a user submits a query that includes the model number, a webpage corresponding to the catalog product name can be identified even though a product represented by the catalog product name may have a different model number (e.g., a newer model number of the same or similar product).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
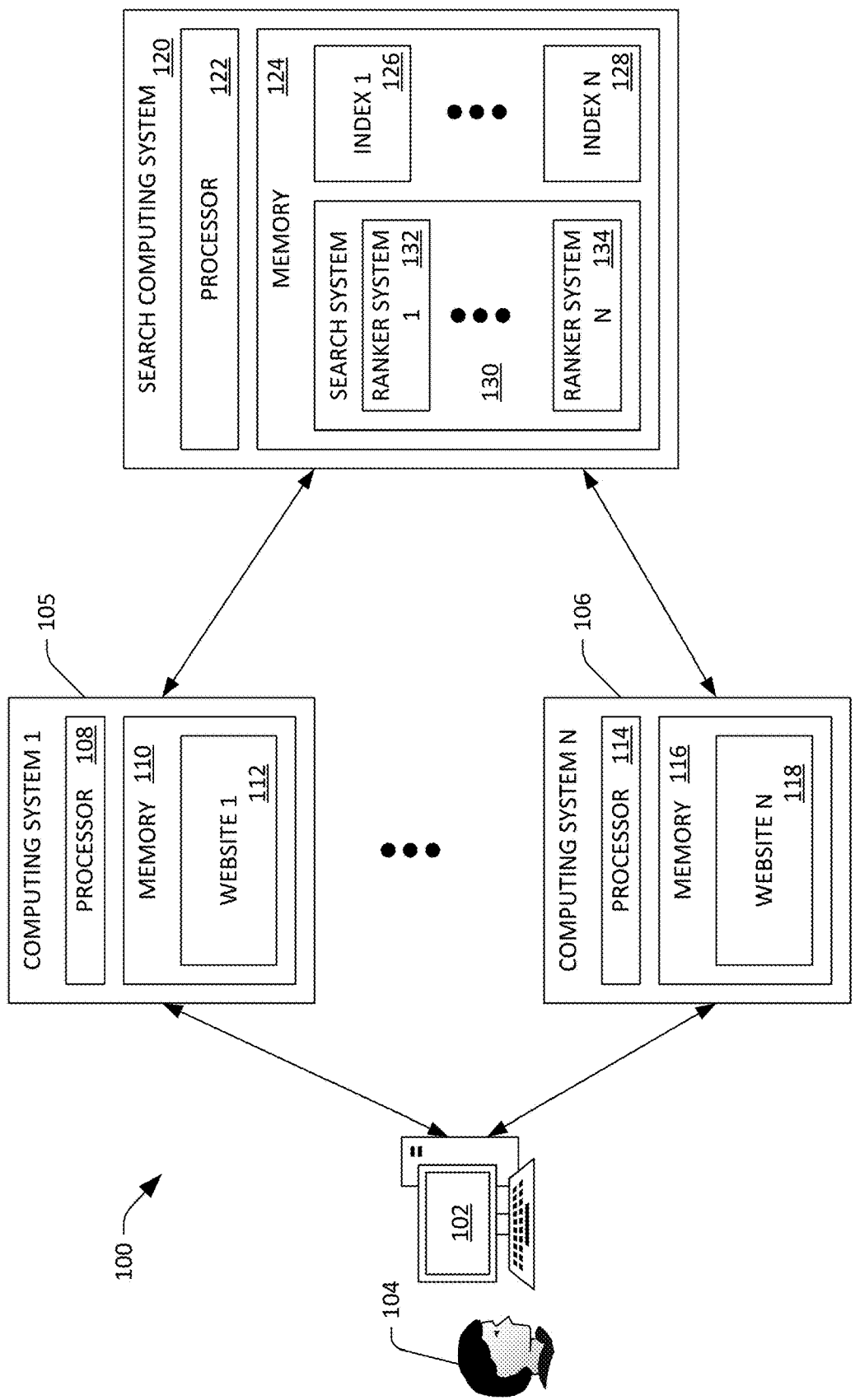
FIG. 1 is a functional block diagram of an exemplary computing system that facilitates returning search results to users.

Various technologies pertaining to generating training data for training a computer-implemented ranker for a website and enriching a searchable index for the website are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component, system, or module may be localized on a single device or distributed across several devices. Further, as used herein, the term "exemplary" is intended to mean serving as an illustration or example of something and is not intended to indicate a preference.

Referring now to FIG. 1, an exemplary system 100 that facilitates returning search results that respectively represent products that are available for purchase by way of websites in response to users submitting queries to the websites is illustrated. The computing system 100 includes a client computing device 102 operated by a user 104, wherein the client computing device 102 may be any suitable type of computing device, such as (but not limited to) a desktop computing device, a laptop computing device, a mobile computing device (e.g., a mobile telephone), a wearable computing device, (e.g., a watch, headgear, etc.), etc.

The system 100 additionally comprises a first computing system 105 through an Nth computing system 106, wherein the computing systems 105-106 host respective websites. The first computing system 105 includes a processor 108 and memory 110, wherein the memory 110 has a first website 112 loaded therein, and further wherein the first website 112 includes a plurality of webpages by way of which the user 104 can purchase respective products in a first set of products that are offered for acquisition by way of the first website 112. For instance, the first website 112 can be configured to offer articles of clothing for acquisition to users (including the user 104), and the webpages of the first website 112 can correspond to respective articles of clothing that can be purchased by way of such webpages. Hence, a first webpage of the first website 112 may include information about a first article of clothing, a second webpage of the first website 112 may include information about a second article of clothing, and so forth.

The Nth computing system 106 can include a processor 114 and memory 116, wherein the memory 116 has an Nth website 118 loaded therein. The Nth website 118 can include webpages that respectively correspond to products that are offered for acquisition by way of the Nth website 118. For instance, an owner/operator of the Nth website 118 may offer electronics for acquisition by way of the Nth website 118. Accordingly, a first webpage of the Nth website 118 may include information about a first electronic device, a second webpage of the Nth website 118 may include information about a second electronic device, and so forth, wherein users can purchase electronic devices by way of webpages of the Nth website 118.

The system 100 also comprises a search computing system 120 that is in communication with the plurality of computing systems 105-106. The search computing system 120 includes a processor 122 and memory 124, wherein the memory 124 includes a first index 128 through an Nth index 128. The first index 126 can be a searchable index of product names that represent products offered for acquisition by way of the first website 112 (and thus the first index 126 can be a searchable index of webpages of the first website 112). Similarly, the Nth index 128 can be a searchable index of product names that represent products offered for acquisition by way of the Nth website 118 (and thus the Nth index can be a searchable index of webpages of the Nth website 118).

The memory 124 also includes a search system 130 that is configured to search the indices 126-128 upon receipt of queries submitted by client computing devices to the computing systems 105-106. The search system 130 includes a first ranker system 132 through an Nth ranker system 134, wherein the first ranker system 132 is configured to rank product names retrieved from the first index 126 based upon queries received from client computing devices by the first computing system 105, while the Nth ranker system 134 is configured to rank product names retrieved from the Nth index 128 based upon queries received from client computing devices by the Nth computing system 106. The first ranker system 132 is customized for the first website 112 while the Nth ranker system 134 is customized for the Nth website 118. Put differently, the first ranker system 132 is trained specifically for products that are offered for acquisition by way of the first website 112, and the Nth ranker system 134 is trained specifically for products that are offered for acquisition by way of the Nth website. Thus, the first ranker system 132 is different from the Nth ranker system. It can thus be ascertained from the above that the owners/operators of the websites 112 and 118 have offloaded searching and ranking of product names to the search computing system 120, despite the websites 112 and 118 offering different products for acquisition.

Exemplary operation of the system 100 is now set forth. The user 104 of the client computing device 102 can direct a browser executing on the client computing device 102 to load a webpage of the first website 112. The webpage may include a text entry field, and the user 104 can set forth a query into the text entry field. Alternatively, the user 104 can set forth a voice query. As described previously, the first website 112 may be configured to offer articles of clothing for acquisition to end users; hence, the query may be "blue pants". The client computing device 102 transmits the query to the first computing system 105 and the first computing system 105, upon receipt of the query, transmits the query to the search computing system 120. The search system 130 is provided with the query and performs a search over the first index 126 based upon the query "blue pants". It is noted that the search system 130 does not search the Nth index 128 based upon the received query, as the Nth index 128 is for the Nth website 118 and not the first website 112. In an example, the search system 130 can identify several product names in the first index 126 based upon the query "blue pants." The first ranker system 132 ranks the identified product names (the product names retrieved from the first index 126 as search results).

As indicated previously, the first ranker system 132 is customized for the first website 112 in that the first ranker system 132 is trained based upon training data that corresponds to products that are offered for acquisition by way of the first website 112. Upon the first ranker system 132 ranking the product names, the search computing system 120 transmits the ranked product names to the first computing system 104, which can return a ranked list of webpages that correspond to the product names to the client computing device 102. The technologies described herein pertain to generating training data that is used to train ranker systems 132-134. The technologies described herein further pertain to enriching the indices 126-128 to allow for robust matching of query terms with features that pertain to products offered for acquisition by way of the websites 112 and 118.

While the first ranker system 132 and the first index 126 are illustrated as being included in the search computing system 120 (and separate from the first computing system 105), it is to be understood that the first ranker system 132 and the first index 126 can be included in the memory 110 of the first computing system 105. In such an embodiment, the first index 126 is constructed and enriched by a third-party computing system and the first ranker system 132 is constructed and trained by the third-party computing system.

Figure 2:
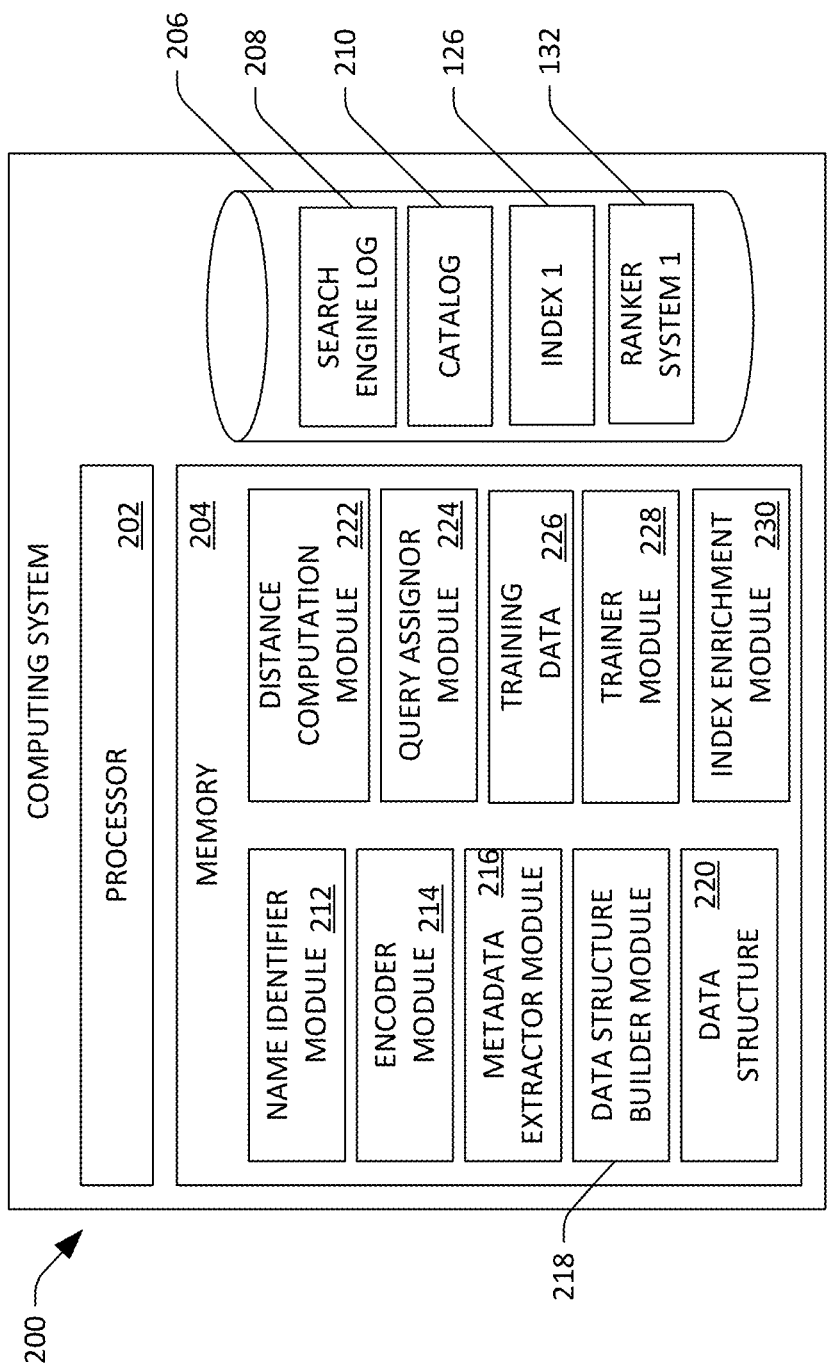
FIG. 2 is a functional block diagram of an exemplary computing system that is configured to generate training data for training a computer-implemented ranker.

Referring now to FIG. 2, a functional block diagram of an exemplary computing system 200 that is configured to generate training data for training a computer-implemented ranker is illustrated. The computing system 200 comprises a processor 202 and memory 204. The computing system 200 additionally comprises a data store 206, wherein the data store 206 includes a search engine log 208 that comprises a plurality of log entries. Each log entry in the plurality of log entries includes a query submitted to a general-purpose search engine by a respective user and a URL of a webpage selected by the user when the webpage was included in a ranked list of search results returned to the user by the general-purpose search engine based upon the query. The general-purpose search engine is configured to search for webpages that are available by way of the World Wide Web from numerous different websites based upon received queries. The data store 206 also includes a catalog 210 for a website (e.g., the first website 112). The catalog 210 can include product names of products that are to be made available for acquisition by way of the first website 112 and corresponding features of the products. The features may include attributes of the products, prices of the products, metadata pertaining to the products, etc. The catalog 210 is provided to the computing system 200 by an owner/operator of the first website 112, such that the computing system 200 has products names for products that are to be offered for acquisition by the first website 112 and corresponding features of such products.

The memory 204 includes several modules that operate in conjunction with one another to generate training data for training the first ranker system 132 and for enriching the first index 126. Such modules include a name identifier module 212 that is configured to identify product names in URLs of log entries in the search engine log 208. For instance, the name identifier module 212 can search the search engine log 208 for URLs that include a (second-level) domain name from amongst a predefined set of (second-level) domain names. Such domain names can be previously identified as corresponding to websites that offer products and/or services for acquisition. The name identifier module 212, upon identifying a URL in a log entry that includes a domain name from amongst the predefined set of domain names, extracts a product name from the URL. For instance, the name identifier module 212 can extract the product name from the URL based upon a known structure of URLs that include the domain name.

The memory 204 also includes an encoder module 214 that is configured to receive product names and perform word embedding on such product names, such that each received product name is encoded into a respective vector of predefined length. The encoder module 214 can be trained based upon labeled training data, wherein the labeled training data includes product names and contexts in which the product names are employed. Thus, for each unique product name retrieved from the search engine log 208 by the name identifier module 212, the encoder module 214 can encode such product name into a respective vector of predefined length, thereby generating a set of encoded product names. Further, the encoder module 214 is provided with the product names from the catalog 210, and for each product name in the catalog 210 the encoder module 214 can output a respective vector of the predefined length, thereby generating a set of encoded catalog product names.

The memory 204 can also include a metadata extractor module 216 that is configured to extract metadata from webpages whose URLs include product names (as output by the name identifier module 212). For example, the metadata extractor module 216 can receive a URL identified by the name identifier module 212 as including a product name. The metadata extractor module 216 can retrieve the webpage through use of the URL, wherein the webpage can be retrieved from a web server or a cache of the general-purpose search engine. The metadata extractor module 216, upon retrieving the webpage, can extract metadata about the product from the webpage. Such metadata can include attributes of the product, such as a model number of the product, a color of the product, a brand of the product, a size of the product, and so forth. In an example, the metadata extractor module 216 can extract the metadata based upon known structures of webpages of certain websites.

The memory 204 also comprises a data structure builder module 218 that builds a data structure 220 based upon the log entries in the search engine log 208 that have been identified by the name identifier module 212 as having a URL that includes a product name, the encoded product names output by the encoder module 214, and the metadata about products extracted from webpages by the metadata extractor module 218. For example, the data structure 220 can have a tree-like structure.

The memory 204 also includes a distance computation module 222, wherein the distance computation module 222 is configured to receive an encoded catalog product name (which represents a product name from the catalog 210) and is further configured to identify encoded product names in the data structure 220 that are within a threshold distance of the encoded catalog product name. For example, the distance computation module 222 can compute a cosine distance between the encoded catalog product name and encoded product names in the data structure 220 and can identify encoded product names that are within the threshold distance from the encoded catalog product name. When an encoded product name from the data structure 220 is within the threshold distance from the encoded catalog product name, the product names represented by the encoded product name from the data structure 220 and the encoded catalog product name are semantically the same or very similar to one another.

The memory 204 also includes a query assignor module 224 that is configured to assign one or more queries to product names from the catalog 210 based upon distances computed by the distance computation module 222. For example, when a distance between an encoded catalog product name and an encoded product name from the data structure 220, as computed by the distance computation module 222, is beneath the threshold, the query assignor module 224 can assign queries that are mapped to the encoded product name in the data structure 220 to the catalog product name that is represented by the encoded catalog product name. Hence, the query assignor module 224 can generate training data 226, wherein the training data 226 includes catalog product name/query pairs, and further wherein the catalog product names in the catalog product name/query pairs are from the catalog 210 and the queries in the catalog name/query pairs are from the search engine log 208.

The memory 204 can also include a trainer module 228 that trains the first ranker system 132 based upon the training data 226. Thus, the first ranker system 132 can be customized based upon product names in the catalog 210 without requiring the training data 226 to be generated based upon user interactions with webpages in the first website 112. Once trained, the first ranker system 132 can be deployed.

The memory 204 can also include an index enrichment module 230 that is configured to enrich the first index 126 with metadata extracted from webpages by the metadata extractor module 216. For example, when a distance between an encoded product name from the data structure 220 and an encoded catalog product name is beneath the threshold, metadata extracted from a webpage corresponding to the encoded product name in the data structure 220 can be mapped to the catalog product name in the first index 126. Including such metadata in the first index 126 enables the search system 130 to identify the catalog product name as a search result when a query includes the metadata.

The computing system 200 exhibits various advantages over conventional approaches for deploying ranker systems in the computing architecture illustrated in FIG. 1, where a third-party search system is employed to perform searching and ranking based upon queries received by computing systems that host websites from client computing devices. When an owner/operator of a website desires to initially employ the search computing system 120 to perform searching and ranking, the owner/operator of the website need not have a significant amount of training data for the catalog of products that are to be offered by way of the website. Instead, the computing system 200 can generate training data that is used to train a computer-implemented ranker, wherein the computer-implemented ranker is customized for the catalog of products. In addition, the computing system 200 can enrich a searchable index based upon product names that represent products that are to be offered for acquisition by way of the website. Therefore, users that submit queries to the website are provided with search results that are relevant and properly ranked, despite the owner/operator of the website not being in possession of training data. In contrast, conventionally, the search system 130 relies upon a general-purpose ranker that is not customized for the products being offered for sale by way of the website, which may result in suboptimal ranking.

Figure 3:
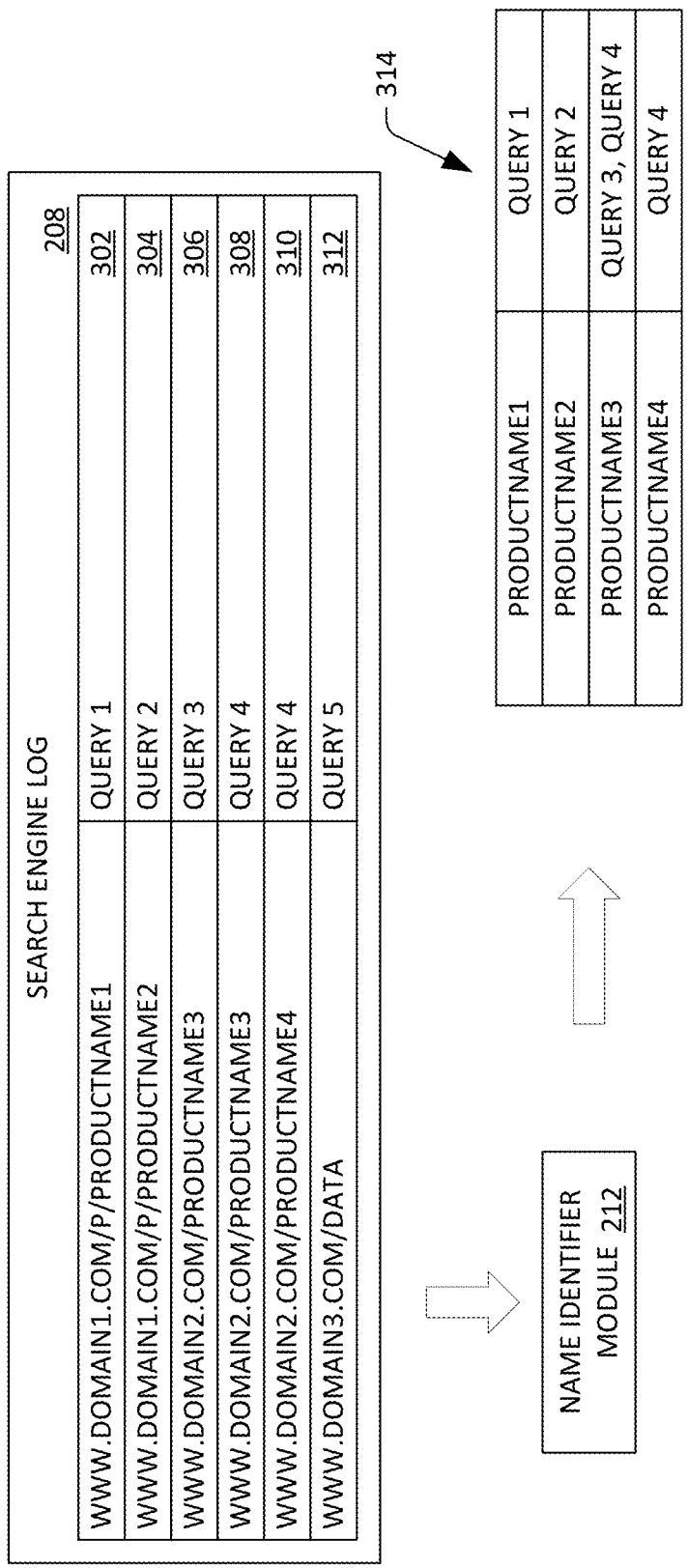
FIG. 3 is a functional block diagram of a name identifier module that is configured to generate product name/query pairs from a search log of a general-purpose search engine.

Operation of the computing system 200 is now set forth by way of examples that are illustrated in FIGS. 3-9. With reference now solely to FIG. 3, exemplary operation of the name identifier module 212 is set forth. The name identifier module 212 accesses the search engine log 208 and searches the search engine log for URLs that include domain names from a predefined set of domain names. Domain names in the predefined set of domain names correspond to websites where products and/or services are known to be offered for acquisition. In the exemplary search engine log 208 illustrated in FIG. 3, the search engine log 208 comprises six log entries 302-312. The first log entry 302 indicates that a user submitted a first query (QUERY 1) and upon being presented with search results for the first query, selected a search result that has a first URL that includes a first domain name (DOMAIN1). The second log entry 304 indicates that a user submitted a second query (QUERY 2) and upon being presented with search results for the second query selected a search result that has a second URL that includes the first domain name. The third log entry 306 indicates that a user submitted a third query (QUERY 3) and upon being presented with search results for the third query selected a search result that has a third URL that includes a second domain name (DOMAIN2). The fourth log entry 308 indicates that a user submitted a fourth query and upon being presented with search results for the fourth query selected a search result that has the third URL. The fifth log entry 310 indicates that a user submitted the fourth query and upon being presented with search results for the fourth query selected a search result that has a fourth URL that includes the second domain name. Finally, the sixth log entry indicates that a user submitted a fifth query and upon being presented with search results for the fifth query selected a search result that has a fifth URL that includes a third domain name (DOMAIN 3).

The name identifier module 212 is configured to search the URLs in the log entries 302-312 for URLs that include a domain name from amongst a predefined set of domain names. For example, the predefined set of domain names may include DOMAIN1 and DOMAIN2 (but not DOMAIN3). Therefore, for instance, the name identifier module 212 can identify the first five log entries 302-310 from the search engine log 208, as such log entries include URLs that include one of DOMAIN1 or DOMAIN2 as a domain name. URLs that include the domain names DOMAIN1 and DOMAIN2 can have a known structure, wherein product names are included in particular positions in the URLs. For example, when a URL includes the domain name DOMAIN1, a product name exists immediately after the sequence "IP/". Similarly, when a URL includes the domain name DOMAIN2, a product name exists immediately after "DOMAIN2.com/". The name identifier module 212 can extract the product names from the log entries 302-310 in the search engine log 208 and can further extract queries that correspond to such product names in the search engine log 208 to generate a mapping 314 between product names and queries. In the example illustrated in FIG. 3, the mapping 314 maps product names to queries. For example, in the mapping 314, a first product name extracted from the first URL (PRODUCTNAME1) can be mapped to QUERY1, a second product name extracted from the second URL (PRODUCTNAME2) can be mapped to QUERY2, a third product name extracted from the third URL (PRODUCTNAME3) can be mapped to queries QUERY3 and QUERY4, and a fourth product name extracted from the fourth URL (PRODUCTNAME4) can be mapped to QUERY4. In addition, optionally, a number of mappings between product names and queries can be indicated in the mapping 314 (e.g., based upon content of the search engine log 208, PRODUCTNAME is mapped to QUERY 1 150 times).

Figure 4:
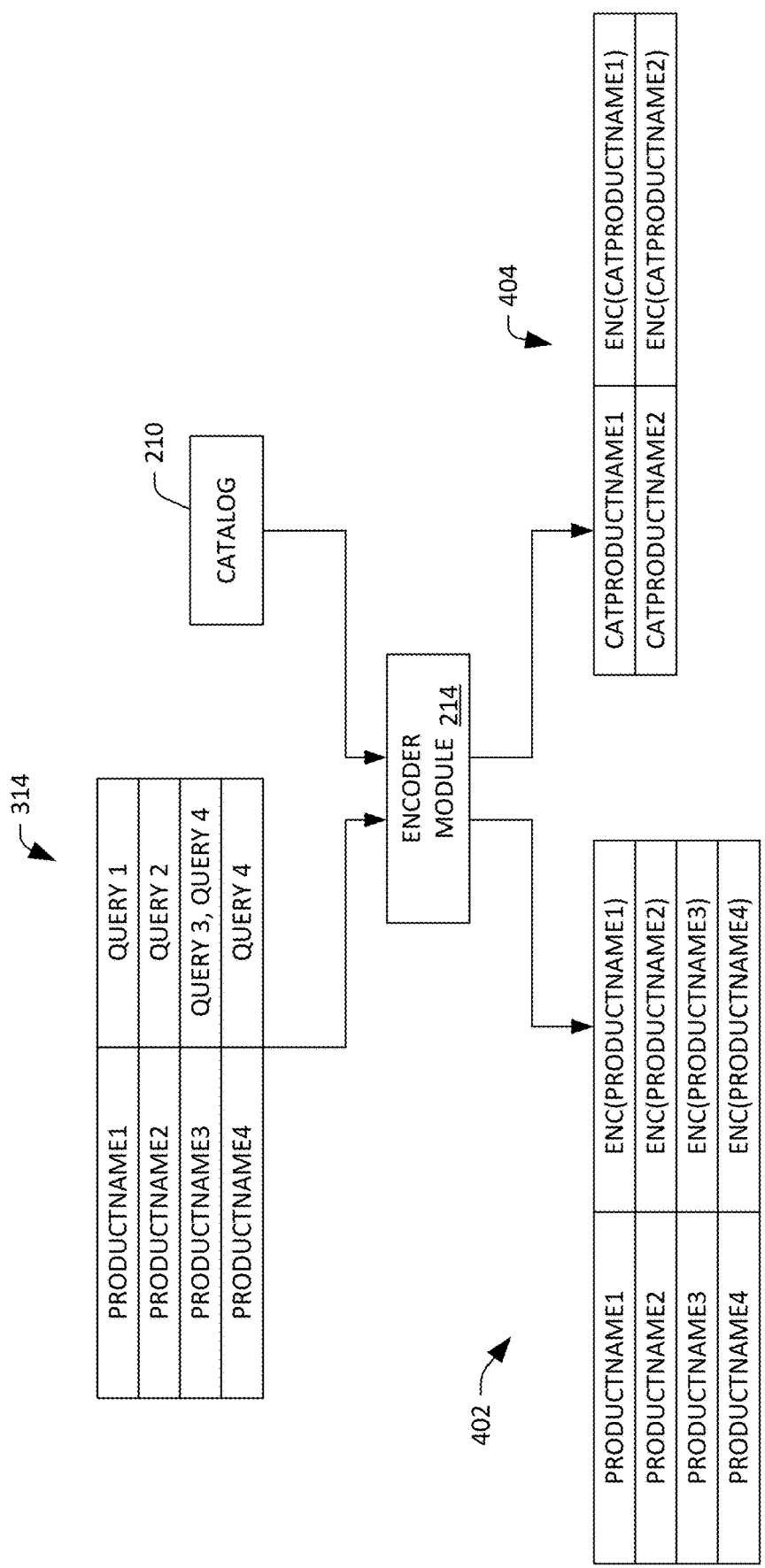
FIG. 4 is a functional block diagram that illustrates an encoder module that is configured to employ word embedding to encode product names.

Referring now to FIG. 4, operation of the encoder module 214 is now described. The encoder module 214 receives the mapping 314 output by the name identifier module 212 and, for each product name included in the mapping 314, employs word embedding to encode a product name into a respective encoded product name. Each encoded product name output by the encoder module 214 is of a predefined length, such as 128 bytes. The encoder module 214 outputs a mapping 402 that maps the product names in the mappings 314 to corresponding encoded product names generated by way of word embedding. Thus, the mapping 402 includes four encoded product names that respectively correspond to the four product names from the mapping 314.

In addition, the encoder module 214 receives the catalog 210, wherein the catalog 210 includes catalog product names (e.g., names of products that are to be offered for acquisition by way of the first website 112). The encoder module 214, for each catalog product name included in the catalog 210, employs word embedding to encode a catalog product name into a respective encoded catalog product name. The encoder module 214 outputs a second mapping 404 that maps the catalog product names from the catalog 210 to corresponding encoded catalog product names generated by way of word embedding. In the example illustrated in FIG. 4, the catalog 210 includes two product names, and thus the second mapping 404 includes two encoded catalog product names. The encoded catalog product names are of the predefined length.

Figure 5:
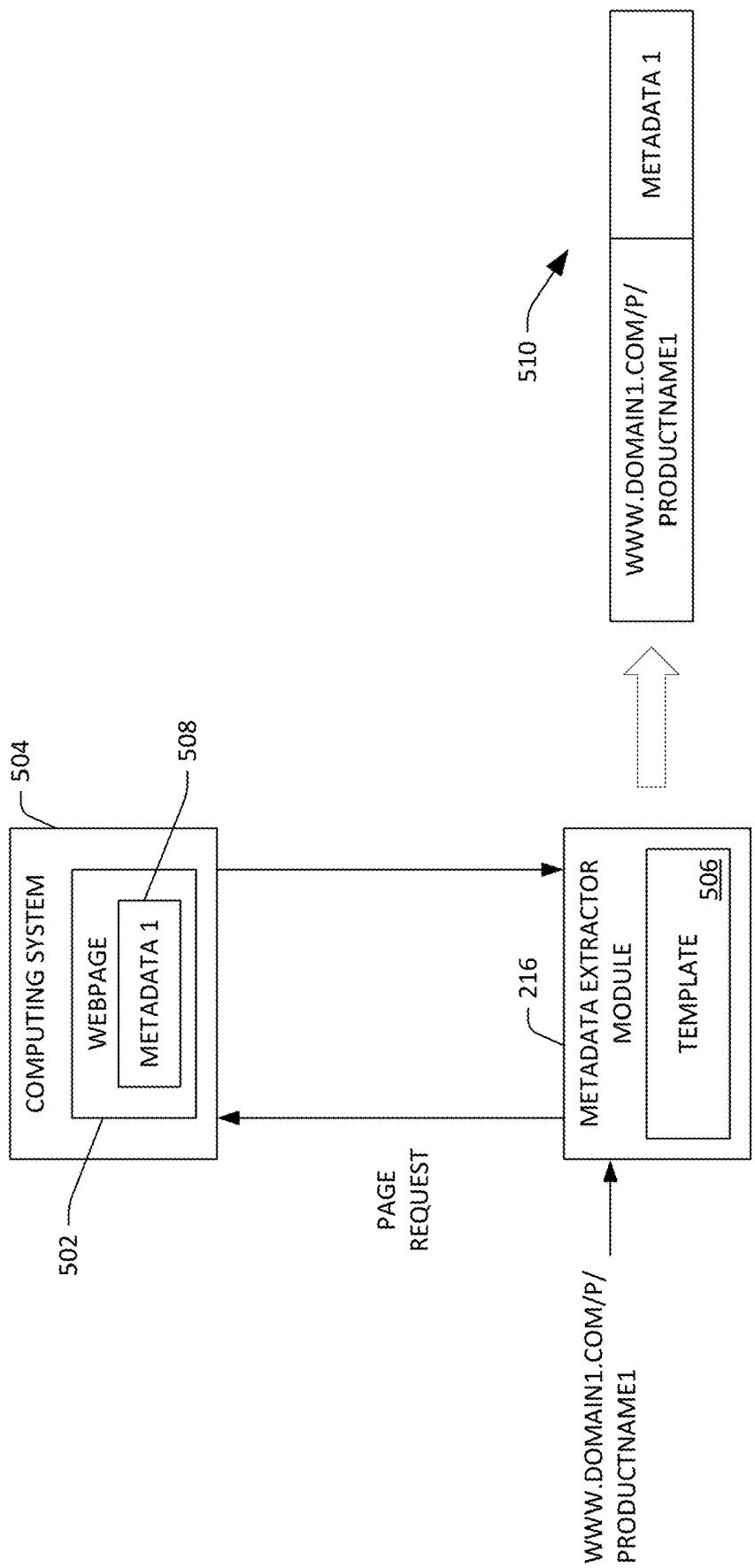
FIG. 5 is a functional block diagram of a metadata extractor module that is configured to extract metadata about products from webpages.

With reference now to FIG. 5, a functional block diagram illustrating operation of the metadata extractor module 216 is presented. The metadata extractor module 216 receives a URL from the search engine log 208, wherein the URL was identified by the name identifier module 214 as including a domain name from the predefined set of domain names, and further wherein the name identifier module 214 has extracted a product name from the URL. For example, as illustrated in FIG. 5, the metadata extractor module 216 can receive the first URL from the first log entry 302 in the search engine log 208 (which has had PRODUCTNAME1 extracted therefrom by the name identifier module 212). Upon receiving the first URL, the metadata extractor module 216 requests a webpage 502 corresponding to the URL from a computing system 504 that hosts the webpage 502. Upon receiving the request, the computing system 504 transmits the webpage 502 that corresponds to the URL to the computing system 200, whereupon the webpage 502 is provided to the metadata extractor module 216.

The metadata extractor module 216 includes a template 506 that identifies locations of metadata 508 in the webpage 502, wherein the metadata 508 is to be extracted from the webpage 502 by the metadata extractor module 216. Further, the URL itself may include metadata pertaining to a product, and the metadata extractor module 216 can extract the metadata from the URL. Exemplary metadata that can be extracted from the webpage 502 includes values of attributes of a product that is being offered for sale by way of the webpage 502, a model number of the product, descriptive text pertaining to the product, etc. While FIG. 5 illustrates that the metadata extractor module 216 receives the webpage 502 from the computing system 504 that hosts the webpage, it is to be understood that the metadata extractor module 216 can retrieve the webpage 502 from a search engine cache. The metadata extractor module 216 outputs a mapping 510 between the URL received by the metadata extractor module 216 and the metadata 508 extracted from the webpage 502 by the metadata extractor module 216. In another example, the mapping 510 may be a mapping between the product name included in the URL and the metadata 508 extracted from the webpage 502.

Figure 6:
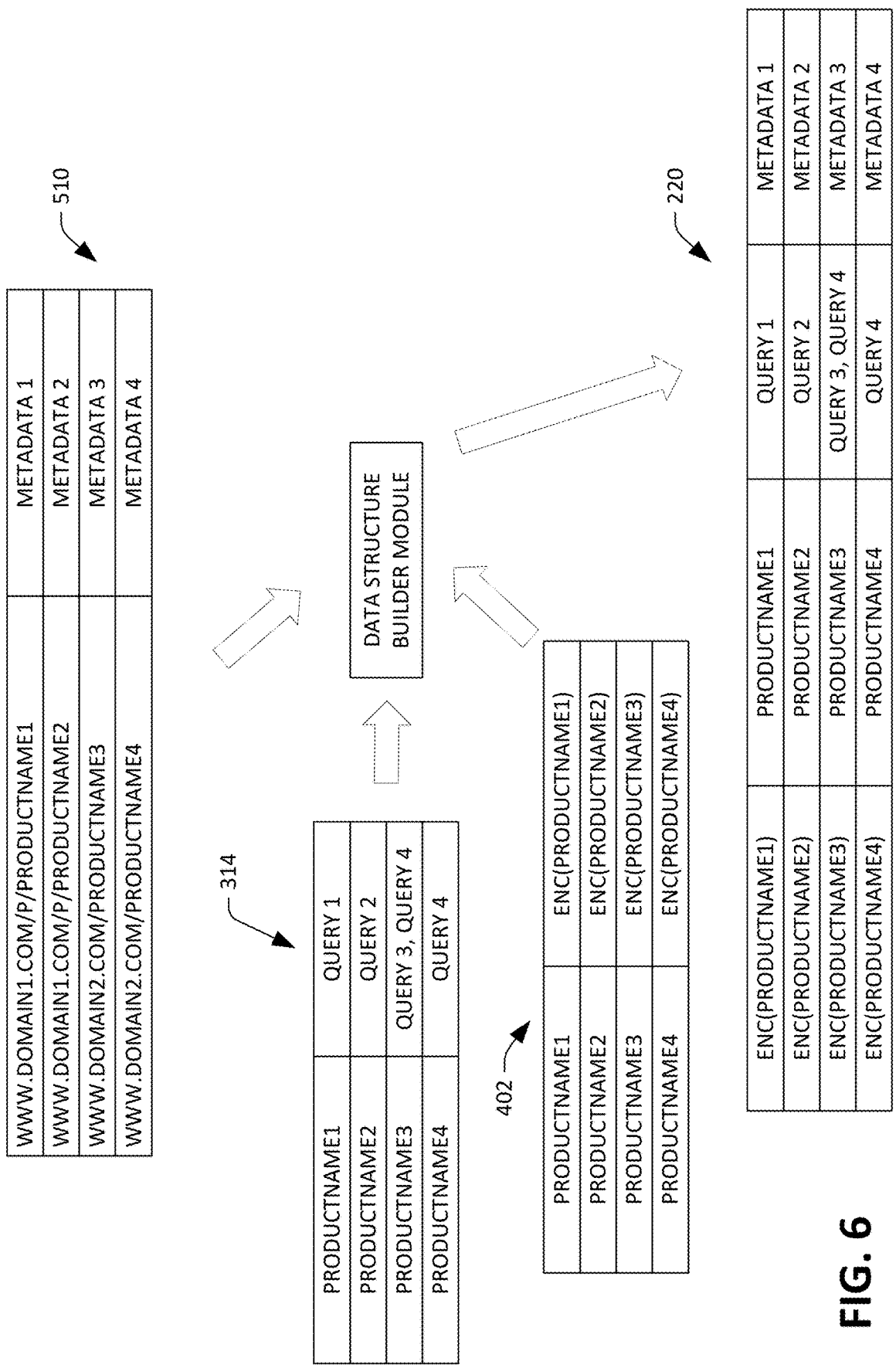
FIG. 6 is a functional block diagram of a data structure builder module that is configured to construct a data structure based upon outputs of modules depicted in FIGS. 3-5.

Now referring to FIG. 6, exemplary operation of the data structure builder module 218 is presented. The data structure builder module 218 receives the mappings 314, 402, and 510 output by the name identifier module 212, the encoder module 214, and the metadata extractor module 216, respectively, and constructs the data structure 220 based upon the received mappings 314, 402, and 510. The data structure 220 includes a mapping between encoded product names and queries. The data structure 220 can also optionally include a mapping between encoded product names and the product names upon which the encoded product names are respectively based. The data structure 220 can further optionally include a mapping between encoded product names and metadata extracted from webpages. In an example, while not illustrated as such, the data structure 220 may have a tree-like structure, with nodes corresponding to portions of encoded product names that reoccur amongst several encoded product names.

Figure 7:
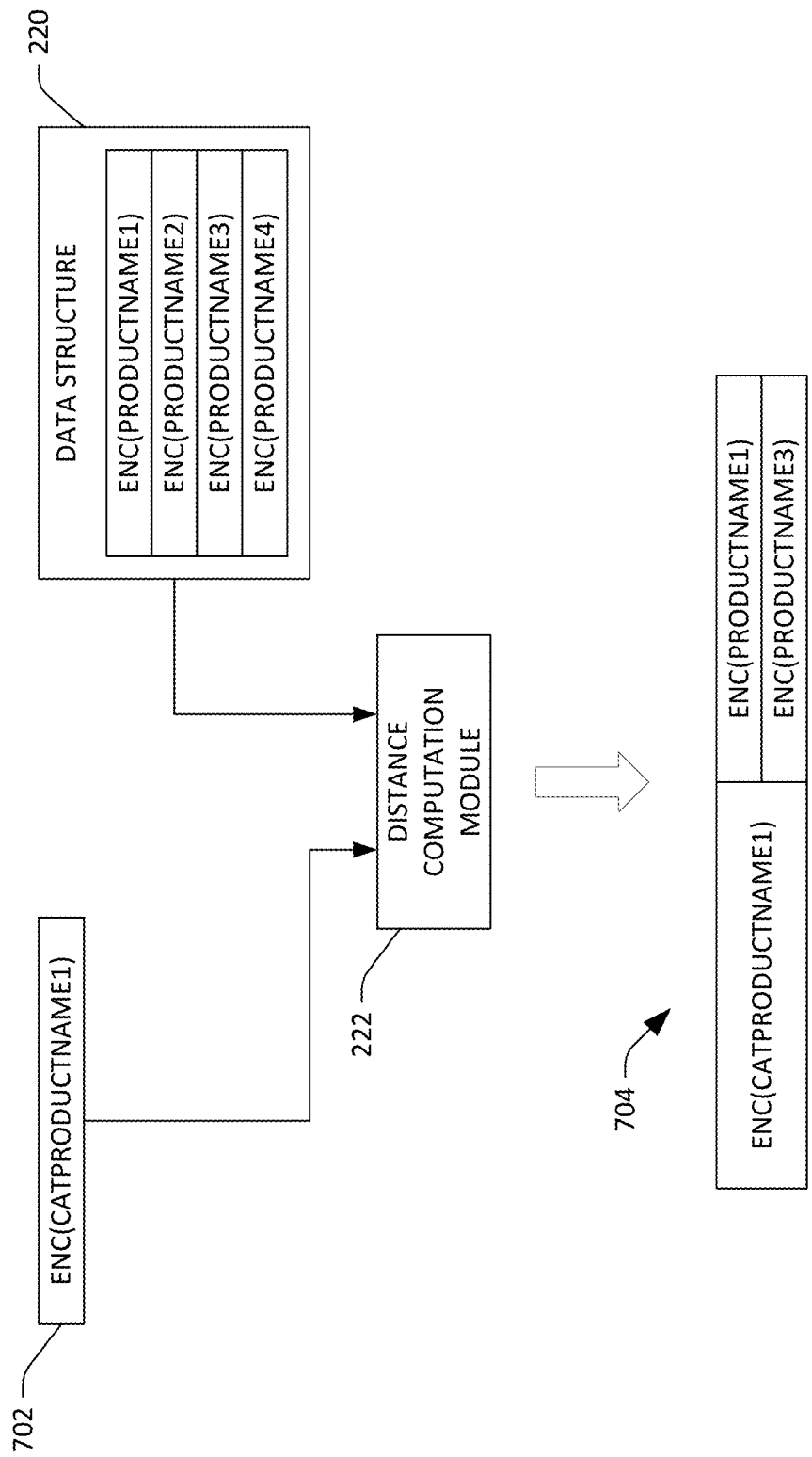
FIG. 7 is a functional block diagram of a distance computation module that is configured to compute distances between encoded product names.

Now referring to FIG. 7, exemplary operation of the distance computation module 222 is described. In an example, the distance computation module 222 receives an encoded catalog product name 702 included in mapping 404 output by the encoder module 214. The distance computation module 222 also has access to the data structure 220. The distance computation module 222 computes distances between the encoded catalog product name 702 and the encoded product names in the data structure 220, wherein the distances can be cosine distances. For a computed distance, the distance computation module 222 compares the distance with a predefined threshold distance. The distance computation module 222 outputs a mapping 704 that maps the encoded catalog product name to encoded product names that are within the predefined threshold distance to the encoded catalog product name. In the example depicted in FIG. 7, the mapping 704 maps a first encoded catalog product name to a first encoded product name and a third encoded product name from the data structure 220, thereby indicating that a first product name in the catalog 220 is the same as or very similar to the first product name and the third product name (PRODUCTNAME1 and PRODUCTNAME3) from the search engine log 208. Such process can be repeated for each encoded catalog product name, such that the mapping 704 can map encoded catalog product names to encoded product names.

Figure 8:
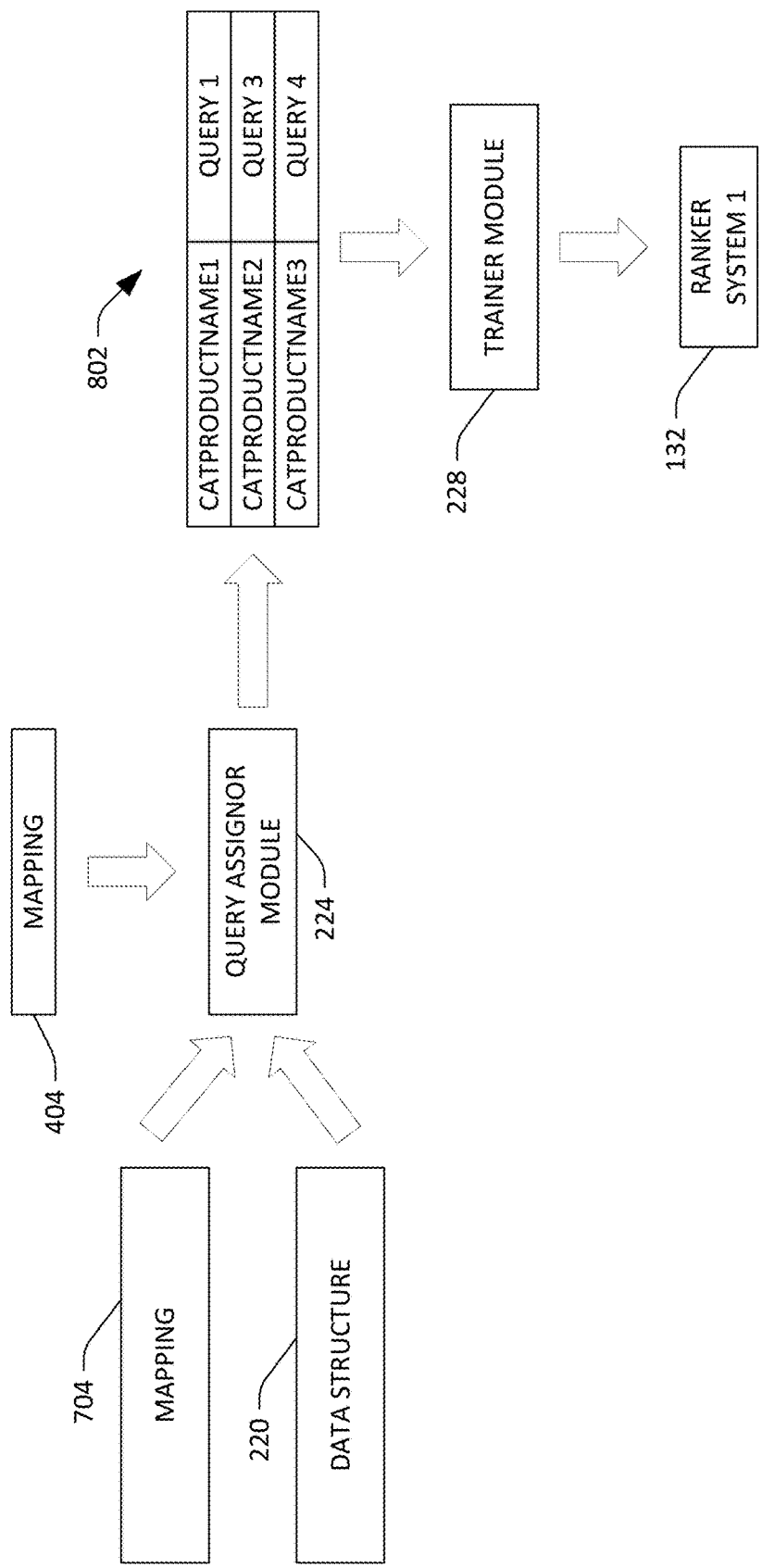
FIG. 8 is a functional block diagram of an exemplary query assignor module that is configured to assign queries to product names.

With reference to FIG. 8, exemplary operation of the query assignor module 224 is set forth. The query assignor module 224 receives the data structure 220, the mapping 704 that maps the encoded catalog product name to the encoded product names from the data structure 220, and the mapping 404 that maps the encoded catalog product name to the catalog product name. The query assignor module 224 identifies, from the mapping 704, each encoded product name that is mapped to the encoded catalog product name. The query assignor module 224 additionally retrieves, from the data structure 220, queries that are mapped to the encoded product name(s) that are mapped to the encoded catalog product name in the mapping 704. The query assignor module 224 further identifies the catalog product name that is mapped to the encoded catalog product name from the mapping 404. The query assignor module 224 generates catalog product name/query pairs 802 based upon the mappings 404 and 704 and the data structure 220.

In a specific example, the query assignor module 224 can ascertain that the first encoded catalog product name is mapped to the first encoded product name in the mapping 704. The query assignor module 224 can then search the data structure 220 based upon the first encoded product name and can ascertain that the first encoded product name is mapped to the first query (QUERY 1). The query assignor module 224 can determine that the first encoded catalog product name is mapped to the first catalog product name (CATPRODUCTNAME1) in the mapping 404. Based upon these mappings, the query assignor module 224 can generate the following catalog product name/query pair: CATPRODUCTNAME1/QUERY 1. Continuing with this example, the query assignor module 224 can determine that the first encoded catalog product name is mapped to the third encoded product name in the mapping 704. The query assignor module 224 can then search the data structure 220 based upon the third encoded product name and can determine that the third encoded product name is mapped to the third query (QUERY 3) and the fourth query (QUERY 4). The query assignor module 224 has determined that the first encoded catalog product name is mapped to the first catalog product name in the mapping 404. Based upon these mappings, the query assignor module 224 can generate two catalog product name/query pairs: CATPRODUCTNAME1/QUERY3 and CATPRODUCTNAME1/QUERY4. Further, the query assignor module 224 can assign weights to the catalog product name/query pairs based upon a number of occurrences of product name/query pairs in the search engine log 208 that include a query and a product name that is mapped to the catalog product name. For instance, if the product name/query pair PRODUCTNAME1/QUERY1 occurred 150 times in the search engine log 208, the query assignor module 224 can assign a weight to the catalog product name/query pair CATPRODUCTNAME1/QUERY1 that is based upon such number of occurrences. Summarily, then, the query assignor module 224 assigns queries observed in the search engine log 208 of the general-purpose search engine to product names in the catalog 210. The trainer module 228 is provided with such pairs 802 and trains the first ranker system 132 based upon the pairs 802.

Figure 9:
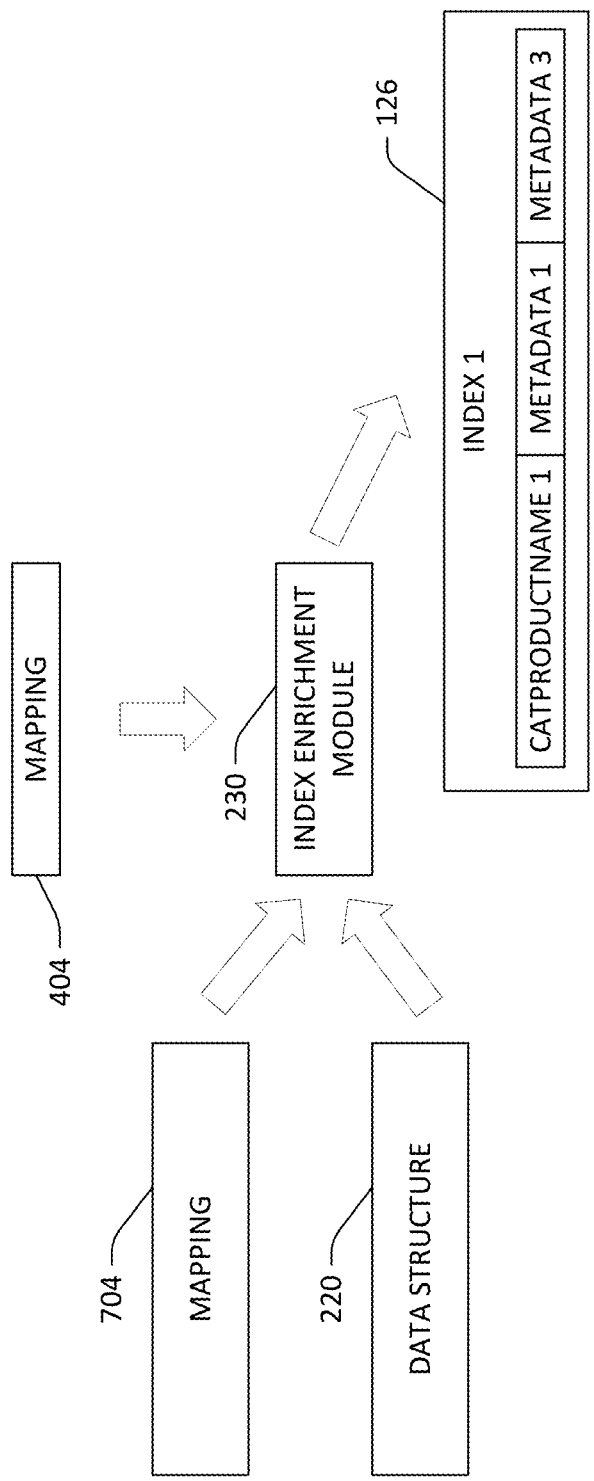
FIG. 9 is a functional block diagram of an index enrichment module that is configured to enrich a searchable index of a website.

Referring now to FIG. 9, exemplary operation of the index enrichment module 230 is depicted. The index enrichment module 230 receives the data structure 220, the mapping 704 that maps the encoded catalog product name to the encoded product names from the data structure 220, and the mapping 404 that maps the encoded catalog product name to the catalog product name. The index enrichment module 230 identifies, from the mapping 704, each encoded product name that is mapped to the encoded catalog product name. The index enrichment module 230 additionally retrieves, from the data structure 220, metadata that is mapped to the encoded product name(s) in the data structure 220, wherein such encoded product name(s) are mapped to the encoded catalog product name in the mapping 704. The index enrichment module 230 further identifies the catalog product name that is mapped to the encoded catalog product name from the mapping 404. The index enrichment module 230 enriches the first index 126 based upon the mappings 404 and 704 and the data structure 220.

In a specific example, the index enrichment module 230 can ascertain that the first encoded catalog product name is mapped to the first encoded product name in the mapping 704. The index enrichment module 230 can then search the data structure 220 based upon the first encoded product name and can ascertain that the first encoded product name is mapped to the first metadata (METADATA 1). The index enrichment module 230 can determine that the first encoded catalog product name is mapped to the first catalog product name (CATPRODUCTNAME1) in the mapping 404. Based upon these mappings, the query assignor module 224 can update the first index 126 to indicate that METADATA 1 corresponds to CATPRODUCTNAME1. Continuing with this example, the index enrichment module 230 can determine that the first encoded catalog product name is mapped to the third encoded product name in the mapping 704. The index enrichment module 230 can then search the data structure 220 based upon the third encoded product name and can determine that the third encoded product name is mapped to the third metadata (METADATA 3). The index enrichment module 230 has determined that the first encoded catalog product name is mapped to the first catalog product name in the mapping 404. Based upon these mappings, the index enrichment module 230 can update the first index 126 to indicate that METADATA 3 corresponds to CATPRODUCTNAME1. Accordingly, the first index 126 (which corresponds to the catalog 220) is enriched with metadata extracted from webpages identified in the search engine log 208 of the general-purpose search engine.

Figure 10:
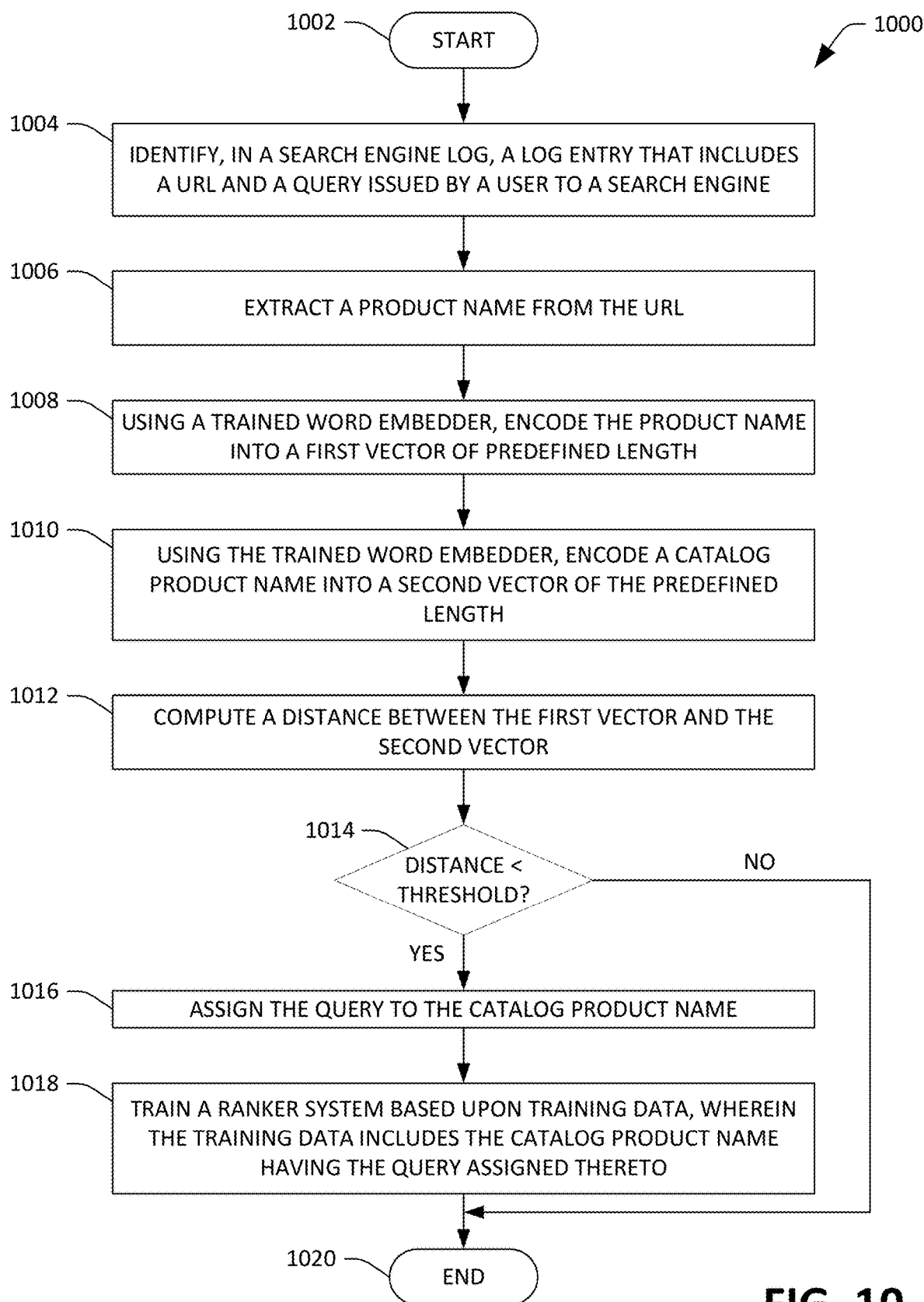
FIG. 10 is a flow diagram that depicts an exemplary methodology for training a computer-implemented ranker.
Figure 11:
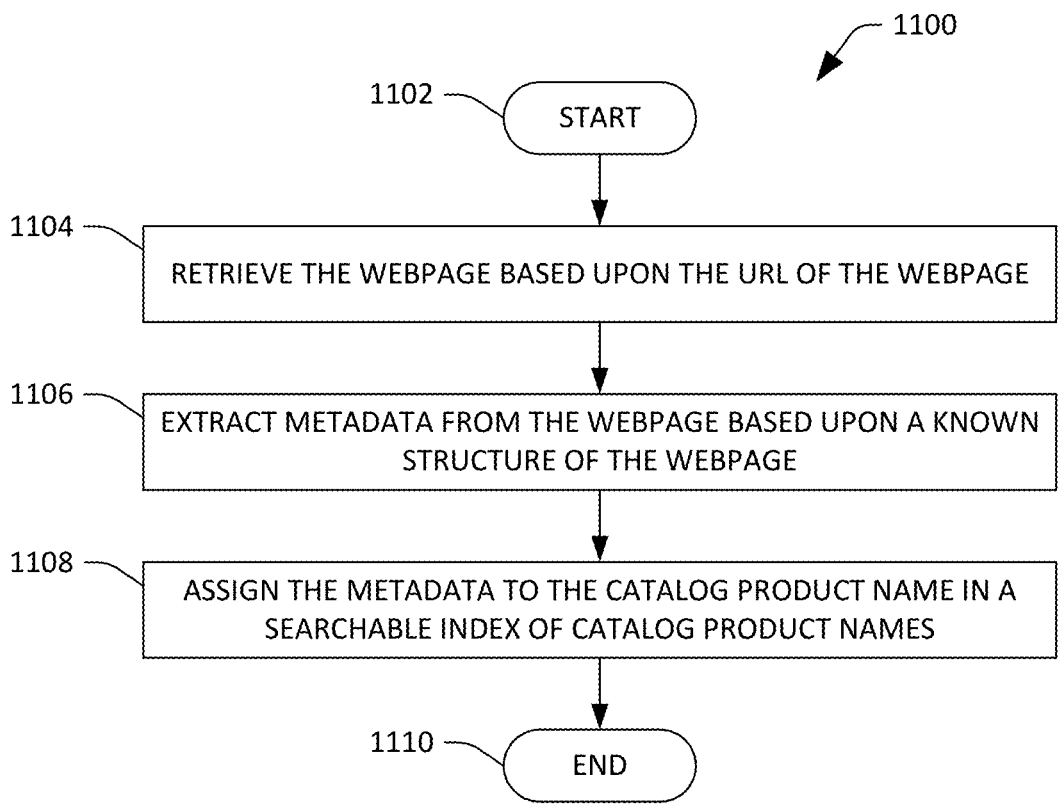
FIG. 11 is a flow diagram illustrating an exemplary methodology for enriching a searchable index of a website.

FIGS. 10 and 11 illustrate exemplary methodologies relating to generating training data and enriching an index, as described above. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 10, a flow diagram illustrating an exemplary methodology 1000 for training a computer-implemented ranker is illustrated. The methodology 1000 starts at 1002, and at 1004 a log entry is identified in a search engine log based upon the log entry including a URL that comprises a domain name from amongst a predefined set of domain names. The log entry includes a query submitted by a user and the URL, wherein the URL corresponds to a webpage returned by a general-purpose search engine as a search result upon the search engine receiving the query. For example, the user may have submitted the query "blue pants" to the general-purpose search engine and may have been provided with several search results. The user may have selected a search result from the search results, wherein the URL identifies the selected search result, and further wherein the domain name is known to correspond to a first website that offers articles of clothing for acquisition to users.

At 1006, a product name is extracted from the URL of the webpage in the log entry. As described previously, the product name can be extracted from the URL of the webpage based upon a known structure of URLs that include the domain name.

At 1008, using a trained word embedder, the product name is encoded into a first vector of predefined length. At 1010, using the trained word embedder, a catalog product name is encoded into a second vector of the predefined length, wherein the catalog product name represents a product for acquisition by way of a second website that is different from the first website. As described previously, the catalog product name can be included in a catalog of product names that represent products that are to be offered for acquisition by way of the second website.

At 1012, a distance between the first vector and the second vector is computed, and at 1014, a determination is made as to whether the distance is less than a predefined threshold. When it is determined at 1014 that the distance is less than the predefined threshold, then at 1016 the query from the log entry identified at 1004 is assigned to the catalog product name. At 1018 a ranker system is trained based upon training data, wherein the training data includes a catalog product name/query pair that includes the catalog product name and the query from the log entry that was assigned to the catalog product name at 1016. When it is determined at 1014 that the distance is not less than the threshold, then the methodology completes 1020.

Now referring to FIG. 11, a flow diagram illustrating an exemplary methodology 1100 for enriching an index is illustrated. Acts of the methodology 1100 can be performed in conjunction with one or more acts of the methodology 1000. The methodology 1100 starts at 1102, and at 1104 the webpage corresponding to the URL in the log entry identified at 1004 (of the methodology 1000) is retrieved. At 1106, metadata is extracted from the webpage based upon a known structure of the webpage. Additionally or alternatively, metadata can be extracted directly from the URL. AT 1108, when it is determined at 1014 (of the methodology 1000) that the distance is less than the predefined threshold, at 1208 the metadata extracted from the webpage is assigned to the catalog product name in a searchable index of catalog product names. The methodology 1100 completes at 1110.

Figure 12:
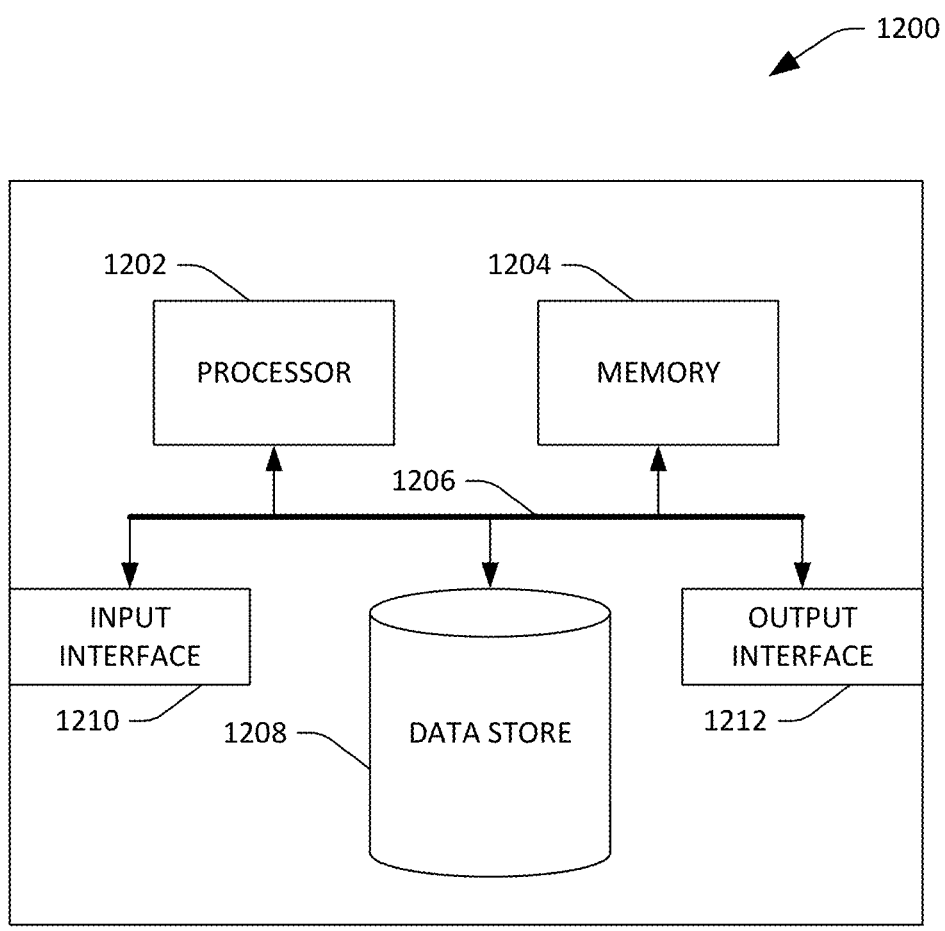
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that supports generating training data to be used to train a computer-implemented ranker. By way of another example, the computing device 1200 can be used in a system that supports enriching a searchable index. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store webpages, search engine log entries, product names, etc.

The computing device 1200 additionally includes a data store 1208 that is accessible by the processor 1202 by way of the system bus 1206. The data store 1208 may include executable instructions, a searchable index, a catalog of product names, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to train a computer-implemented ranker, wherein the computing system comprises:
   a processor; and
   memory storing instructions that, when executed by the processor, cause the processor to perform acts comprising:
      identifying a log entry in a search engine log of a search engine, wherein the log entry comprises:
         a URL of a first webpage that belongs to a first website; and
         a query submitted to the search engine, wherein the search engine returned the first webpage in search results upon receipt of the query;
      extracting, from the URL of the first webpage, a first product name, wherein the first product name identifies a first product that is offered for acquisition by way of the first webpage;
      subsequent to extracting the first product name from the URL of the first webpage, assigning the query in the log entry to a second product name, wherein the second product name identifies a second product that is offered for acquisition by way of a second webpage that belongs to a second website, wherein the first website is different from the second website; and
      training the computer-implemented ranker based upon pairs of product names and queries, wherein the pairs of product names and queries include the second product name and the query, and further wherein the computer-implemented ranker is configured to rank product names based upon queries received by the second website, wherein the product names identify products that are offered for acquisition by way of the second website.

2. The computing system of claim 1, wherein identifying the log entry in the search engine log of the search engine comprises:
   searching the search engine log for log entries that include URLs of webpages that belong to the first website, wherein the log entry is identified due to the URL of the first webpage including a domain name of the first website.

3. The computing system of claim 2, wherein extracting the first product name from the URL of the first webpage comprises:
   identifying the first product name in the URL of the first webpage based upon a template that defines a structure of URLs that include the domain name.

4. The computing system of claim 1, the acts further comprising:
   identifying a second log entry in the search engine log of the search engine, wherein the second log entry comprises:
      a second URL of a third webpage that belongs to a third website, wherein the third website is different from the first website and the second website; and
      a second query submitted to the search engine, wherein the search engine returned the third webpage in second search results upon receipt of the second query;
   extracting, from the second URL of the third webpage, a third product name, wherein the third product name identifies a third product that is offered for acquisition by way of the third webpage;
   subsequent to extracting the third product name from the second URL of the third webpage, assigning the second query in the second log entry to the second product name, wherein the pairs of product names and queries include the second product name and the second query.

5. The computing system of claim 1, the acts further comprising:
   prior to assigning the query in the log entry to the second product name, encoding the first product name into a first vector of a predefined length;
   encoding the second product name into a second vector of the predefined length; and
   computing a distance between the first vector and the second vector, wherein the query in the log entry is assigned to the second product name based upon the distance between the first vector and the second vector.

6. The computing system of claim 5, the acts further comprising:
   comparing the distance between the first vector and the second vector to a predefined threshold, wherein the query in the log entry is assigned to the second product name when the distance between the first vector and the second vector is beneath the threshold.

7. The computing system of claim 1, the acts further comprising:
   subsequent to identifying the log entry in the search engine log of the search engine, retrieving the first webpage through use of the URL of the first webpage in the search engine log;
   extracting metadata from the first webpage, wherein the metadata comprises a value of an attribute of the first product identified by the first product name; and
   assigning the metadata to the second product name in a searchable index for the second website, such that when a second query that includes the value of the attribute is received by way of the second website, the second product name is included in search results that are returned based upon the second query.

8. The computing system of claim 1, the acts further comprising:
   receiving the query from a server computing system that hosts the second website, wherein the server computing system received the query from a client computing device that had loaded a third webpage that belongs to the second website;
   generating search results based upon the query, wherein the search results include the second webpage;

ranking, by the computer-implemented ranker, the search results to generate a ranked list of search results, wherein the second webpage is positioned in the ranked list of search results based upon the query being assigned to the second product name.

9. The computing system of claim 1, wherein the computer-implemented ranker is customized for the second website.

10. The computing system of claim 9, wherein the computer-implemented ranker is a re-ranker that is configured to re-rank ranked lists of search results output by a general-purpose ranker, and further wherein the general-purpose ranker is configured to rank search results for multiple different websites.

11. A method for training a computer-implemented ranker, the method comprising:
identifying a log entry in a search engine log of a search engine, wherein the log entry comprises:
a URL of a first webpage that belongs to a first website; and
a query submitted to the search engine, wherein the search engine returned the first webpage in search results upon receipt of the query;
extracting, from the URL of the first webpage, a first product name, wherein the first product name identifies a first product that is offered for acquisition by way of the first webpage;
subsequent to extracting the first product name from the URL of the first webpage, assigning the query in the log entry to a second product name, wherein the second product name identifies a second product that is offered for acquisition by way of a second webpage that belongs to a second website, wherein the first website is different from the second website; and
training the computer-implemented ranker based upon pairs of product names and queries, wherein the pairs of product names and queries include the second product name and the query, and further wherein the computer-implemented ranker is configured to rank product names based upon queries received by the second website, wherein the product names identify products that are offered for acquisition by way of the second website.

12. The method of claim 11, wherein identifying the log entry in the search engine log of the search engine comprises:
searching the search engine log for log entries that include URLs of webpages that belong to the first website, wherein the log entry is identified due to the URL of the first webpage including a domain name of the first website.

13. The method of claim 12, wherein extracting the first product name from the URL of the first webpage comprises:
identifying the first product name in the URL of the first webpage based upon a template that defines a structure of URLs that include the domain name.

14. The method of claim 11, further comprising:
identifying a second log entry in the search engine log of the search engine, wherein the second log entry comprises:
a second URL of a third webpage that belongs to a third website, wherein the third website is different from the first website and the second website; and
a second query submitted to the search engine, wherein the search engine returned the third webpage in second search results upon receipt of the second query;
extracting, from the second URL of the third webpage, a third product name, wherein the third product name identifies a third product that is offered for acquisition by way of the third webpage;
subsequent to extracting the third product name from the second URL of the third webpage, assigning the second query in the second log entry to the second product name, wherein the pairs of product names and queries include the second product name and the second query.

15. The method of claim 11, further comprising:
prior to assigning the query in the log entry to the second product name, encoding the first product name into a first vector of a predefined length;
encoding the second product name into a second vector of the predefined length; and
computing a distance between the first vector and the second vector, wherein the query in the log entry is assigned to the second product name based upon the distance between the first vector and the second vector.

16. The method of claim 15, further comprising:
comparing the distance between the first vector and the second vector to a predefined threshold, wherein the query in the log entry is assigned to the second product name when the distance between the first vector and the second vector is beneath the threshold.

17. The method of claim 11, further comprising:
subsequent to identifying the log entry in the search engine log of the search engine, retrieving the first webpage through use of the URL of the first webpage in the search engine log;
extracting metadata from the first webpage, wherein the metadata comprises a value of an attribute of the first product identified by the first product name; and
assigning the metadata to the second product name in a searchable index for the second website, such that when a second query that includes the value of the attribute is received by way of the second website, the second product name is included in search results that are returned based upon the second query.

18. The method of claim 11, further comprising:
receiving the query from a server computing system that hosts the second website, wherein the server computing system received the query from a client computing device that had loaded a third webpage that belongs to the second website;
generating search results based upon the query, wherein the search results include the second webpage;
ranking, by the computer-implemented ranker, the search results to generate a ranked list of search results, wherein the second webpage is positioned in the ranked list of search results based upon the query being assigned to the second product name.

19. The method of claim 11, wherein the computer-implemented ranker is customized for the second website.

20. A non-transitory computer-readable storage medium comprising instructions that, when executed by a processor, cause the processor to perform a method for training a computer-implemented ranker, the method comprising:
identifying a log entry in a search engine log of a search engine, wherein the log entry comprises:
a URL of a first webpage that belongs to a first website; and
a query submitted to the search engine, wherein the search engine returned the first webpage in search results upon receipt of the query;

extracting, from the URL of the first webpage, a first product name, wherein the first product name identifies a first product that is offered for acquisition by way of the first webpage;

subsequent to extracting the first product name from the URL of the first webpage, assigning the query in the log entry to a second product name, wherein the second product name identifies a second product that is offered for acquisition by way of a second webpage that belongs to a second website, wherein the first website is different from the second website; and training the computer-implemented ranker based upon pairs of product names and queries, wherein the pairs of product names and queries include the second product name and the query, and further wherein the computer-implemented ranker is configured to rank product names based upon queries received by the second website, wherein the product names identify products that are offered for acquisition by way of the second website.

\* \* \* \* \*